(12) United States Patent
Nykwest et al.

(10) Patent No.: US 11,027,878 B2
(45) Date of Patent: Jun. 8, 2021

(54) REPULPABLE CORRUGATED PROTEIN BOX AND PROCESS FOR MAKING SAME USING WIRE SIDE IMPREGNATION

(71) Applicant: Interstate Resources, Inc., Arlington, VA (US)

(72) Inventors: Lawrence C. Nykwest, Bernville, PA (US); Meredith Sexton, Columbia, SC (US); Kathleen Harmon, Blythewood, SC (US)

(73) Assignee: INTERSTATE RESOURCES, INC., Atlanta, GA (US)

( * ) Notice: Subject to any disclaimer, the term of this patent is extended or adjusted under 35 U.S.C. 154(b) by 0 days.

(21) Appl. No.: 16/536,475

(22) Filed: Aug. 9, 2019

(65) Prior Publication Data

US 2020/0140138 A1 May 7, 2020

Related U.S. Application Data

(60) Provisional application No. 62/684,517, filed on Jun. 13, 2018.

(51) Int. Cl.
*B65D 5/56* (2006.01)
*B65D 5/64* (2006.01)
(Continued)

(52) U.S. Cl.
CPC .............. *B65D 5/563* (2013.01); *B65D 5/64* (2013.01); *B65D 85/70* (2013.01); *D21H 17/02* (2013.01);
(Continued)

(58) Field of Classification Search
CPC .......... B65D 5/563; B65D 5/64; B65D 85/70; B65D 5/5054; B65D 2565/385; D21H 17/02; D21H 19/58; D21H 27/32; D21H 21/16; D21H 17/22; D21H 17/23; D21H 17/24; D21H 17/62; D21H 23/22; D21H 23/24; D21H 23/26; D21H 23/28; D21H 23/30; D21H 23/32; D21H 23/34; D21H 23/36; D21H 23/38; D21H 23/40; D21H 23/42; D21H 23/44; D21H 23/46; D21H 23/48; D21H 23/50; D21H 23/52; D21H 23/54; D21H 23/56; D21H 23/58;
(Continued)

(56) References Cited

U.S. PATENT DOCUMENTS 2,934,467 A * 4/1960 Bergstein ............... D21H 23/64
428/452
3,149,025 A * 9/1964 Dickens ........................ 162/206
(Continued)

*Primary Examiner* — Francisco W Tschen
*Assistant Examiner* — Abhishek A Patwardhan
(74) *Attorney, Agent, or Firm* — McAndrews, Held & Malloy, Ltd.

(57) ABSTRACT

A repulpable moisture resistant protein box having a composite structure with a fluted medium, a top backing board secured to one side of the fluted medium and a bottom backing board secured to the other side of the fluted medium. The backing boards are impregnated with a hydrogenated triglyceride on the wire side and the fluted medium is also impregnated with a hydrogenated triglyceride. The backing boards each have an outer felt side surface coated with styrene acrylic co-polymer. The protein boxes have a higher compression, moisture resistance and are recyclable.

9 Claims, 2 Drawing Sheets

(51) Int. Cl.
    *B65D 85/00*     (2006.01)
    *D21H 17/02*     (2006.01)
    *D21H 19/58*     (2006.01)
    *D21H 27/32*     (2006.01)
    *D21H 21/16*     (2006.01)
    *B65D 5/50*     (2006.01)
    *C09J 103/02*     (2006.01)

(52) U.S. Cl.
    CPC ............. *D21H 19/58* (2013.01); *D21H 21/16* (2013.01); *D21H 27/32* (2013.01); *B65D 5/5054* (2013.01); *B65D 2565/385* (2013.01); *C09J 103/02* (2013.01)

(58) Field of Classification Search
    CPC ........ D21H 23/60; D21H 23/62; D21H 23/64; D21H 23/66; D21H 23/68; D21H 23/70; D21H 23/72; D21H 23/74; D21H 17/06; D21H 17/14; D21H 17/15; C09J 103/02; B31F 5/00
    USPC ......................................................... 156/292
    See application file for complete search history.

(56) References Cited

U.S. PATENT DOCUMENTS

| | | | | |
|---|---|---|---|---|
| 3,293,067 | A * | 12/1966 | Streb | D21H 5/0052 427/208 |
| 3,536,580 | A * | 10/1970 | La Fave | B05B 5/04 162/186 |
| 4,477,535 | A * | 10/1984 | Sinclair | C08F 257/02 427/391 |
| 5,763,100 | A * | 6/1998 | Quick | B65D 65/42 428/486 |
| 2010/0189961 | A1* | 7/2010 | Bugas | B31F 1/2886 428/182 |
| 2014/0239052 | A1* | 8/2014 | Bugas | B32B 29/005 229/5.81 |
| 2017/0350074 | A1* | 12/2017 | Kinast | D21H 17/68 |

* cited by examiner

REPULPABLE CORRUGATED PROTEIN BOX AND PROCESS FOR MAKING SAME USING WIRE SIDE IMPREGNATION

RELATED APPLICATIONS

This application makes reference and claims priority to U.S. Provisional Patent Application Ser. No. 62/684,517, filed on Jun. 13, 2018 and titled "Repulpable Corrugated Protein Box and Process for Making Same Using Wire Side Impregnation." U.S. Provisional Patent Application Ser. No. 62/684,517 is hereby incorporated by reference herein in its entirety.

FIELD OF THE INVENTION

The present invention generally relates to a process for manufacturing moisture resistant and water proof paper products including linerboard and corrugated board. Particularly, this invention relates to a process for moisture resistant paper boxes used primarily in the protein industry that are waterproofed and can be repulped and recycled to be part of the feedstock for new paper products that minimizes environmental concerns.

BACKGROUND OF THE INVENTION

In the manufacture of paper and paperboard and of products made from same, petroleum derived paraffin waxes and synthetic polymers such as polyethylene have been used for many years as moisture retardants, water repellents, oil repellents, stiffeners, strengtheners, and release agents. The paper and paperboard to which paraffin waxes and polyethylene are applied is difficult and often impossible to repulp and recycle in standard paper mill processes because the petroleum derived polymers and, particularly, the petroleum waxes are non-biodegradable in mill white waters (circulated process waters) and discharge effluents. Furthermore, the residue of the petroleum waxes that is not removed from pulp fibers during the expensive repulping and recycling processes causes severe problems due to buildup that occurs on the screens and felts used during the process of forming and making the paper or paperboard sheet. In addition, paper and paperboard coated or impregnated with petroleum waxes resist biodegradation and composting when disposed of in landfills and other waste disposal systems. Paper and paperboard coated or impregnated with traditional synthetic polymers and hetero-polymers are also (i) difficult and often impossible to repulp and recycle owing to their resistance to separation from the fiber in the standard repulping processes, resulting in significant fiber losses in efforts to repulp and recycle them, and (ii) also non-biodegradable and, therefore, resist composting.

Water repellent packaging currently utilizes petroleum based liquid polymers or polymer film laminates (including polyethylene or similar film laminates such as polyolefin, polyester, polyvinyl alcohol, polyvinyl acetate, polystyrene, polypropylene, and the like) which are recyclable after extensive treatment, All of these laminates require the installation of specialized repulping machinery that separates the pulp fibers from the laminated films and/or is far more expensive in terms of operating costs and/or recycled pulp fiber yields. The action of separating the fiber from the film damages some fibers causing them to be selected out of the recycled pulp and presented for reuse and the separated film waste carries some of the fibers out of the repulpate when its adherence is not interrupted by the repulping process. Likewise, coating and/or impregnating products made from or based on paraffin waxes and/or similar petroleum derivatives can only be repulped for recycling in specially configured repulping equipment that removes and separates the paraffin waxes. The more intense physical and chemical requirements of this repulping process coupled with the lost fibers that become trapped in paraffin wax wastes cause the recyclable repulped fiber levels to fall far below those of standard repulping processes. Moreover, boxes made from such products are not biodegradable and must be separated and deposited in separate landfill areas.

The protein box industry is directed towards boxes for containing and handling food products such as beef, pork, poultry, seafood and produce. Currently the industry uses a wax to coat the boxes (EVA-poly (ethylene vinyl acetate) which takes a significantly long period of time to compost and leaves a chemical residue from those compounds. There appears to be little or no decomposition of higher molecular weight resin and EVA fractions.

In the prior art, a number of patents have attempted to address the above noted problem. U.S. Pat. No. 6,103,308 issued Aug. 15, 2000 is directed toward a paper and paperboard coating composition using vegetable oil triglyceride as a paper coating while U.S. Pat. No. 6,201,053 issued Mar. 13, 2001 is directed toward various triglycerides mixed with catalysts for use as a waterproofing agent on paper coating.

U.S. Pat. No. 6,846,573 issued Jan. 25, 2005 discloses the use of hydrogenated triglycerides having a melting point above 50° as a coating material for the surface of paper products to improve wet strength and moisture resistance in addition to being repulpable.

The use of tallow to treat paper is also well known in the prior art. U.S. Pat. No. 2,840,138 issued Jun. 24, 1958 discloses the use of tallow fatty acids to impregnate and penetrate corrugated paper material to provide a wilt resistant material. Also, U.S. Pat. No. 4,752,637 issued Jun. 21, 1988 is directed to a method of treating fiberboard to have superior moisture resistance with various mixtures of hydroxy terminated esters such as tallow.

U.S. Pat. No. 9,701,437 issued Jul. 11, 2017 discloses a repulpable moisture resistant food box having a composite structure with a fluted medium, a top backing board secured to one side of the fluted medium and a bottom backing board secured to the other side of the fluted medium. The backing boards and the fluted medium are impregnated with a hydrogenated triglyceride. The backing boards each have an outer surface coated with an emulsion of hydrogenated triglyceride and styrene acrylic to provide moisture resistance repulpable and recyclable box.

None of the noted references have provided a repulpable, recyclable corrugated box with high slide resistance capable of holding iced products and being moisture resistant.

SUMMARY OF THE INVENTION

The present invention is directed to a backed corrugated protein paper box product which has the outer paper liner or backer sheet surfaces coated on the felt side with a homogenized styrene/acrylic emulsion with the inner corrugated paper medium and wire side of the liner sheets being impregnated with a hydrogenated triglyceride.

Styrene/acrylic polymer or hydrogenated tallow triglycerides can be applied in the same manner as the traditional petroleum waxes and synthetic polymers and function as moisture retardants, water repellents, oil repellents, stiffeners, strengtheners, and release agents in the manufacture of paper, paperboard, packaging, molding forms, and other common applications. A particular advantage is that such hydrogenated triglycerides are readily biodegradable in paper mill white waters and are compostable in landfill or other waste disposal systems. The present invention is easier to repulp and recycle without detriment to production equipment, processes, or manufactured product quality or performance and has a superior slip resistance.

It is an object of this invention to produce a water resistant paper product which can be repulped and recycled and has superior compressive strength.

It is another object of the invention to increase box compression of the water resistance protein boxes.

It is another object of the invention to provide a protein box which is biodegradable.

It is still another object of the invention to provide a protein box which has superior moisture resistance.

It is yet another object of the invention to improve the hot melt glueability of moisture resistance protein boxes.

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
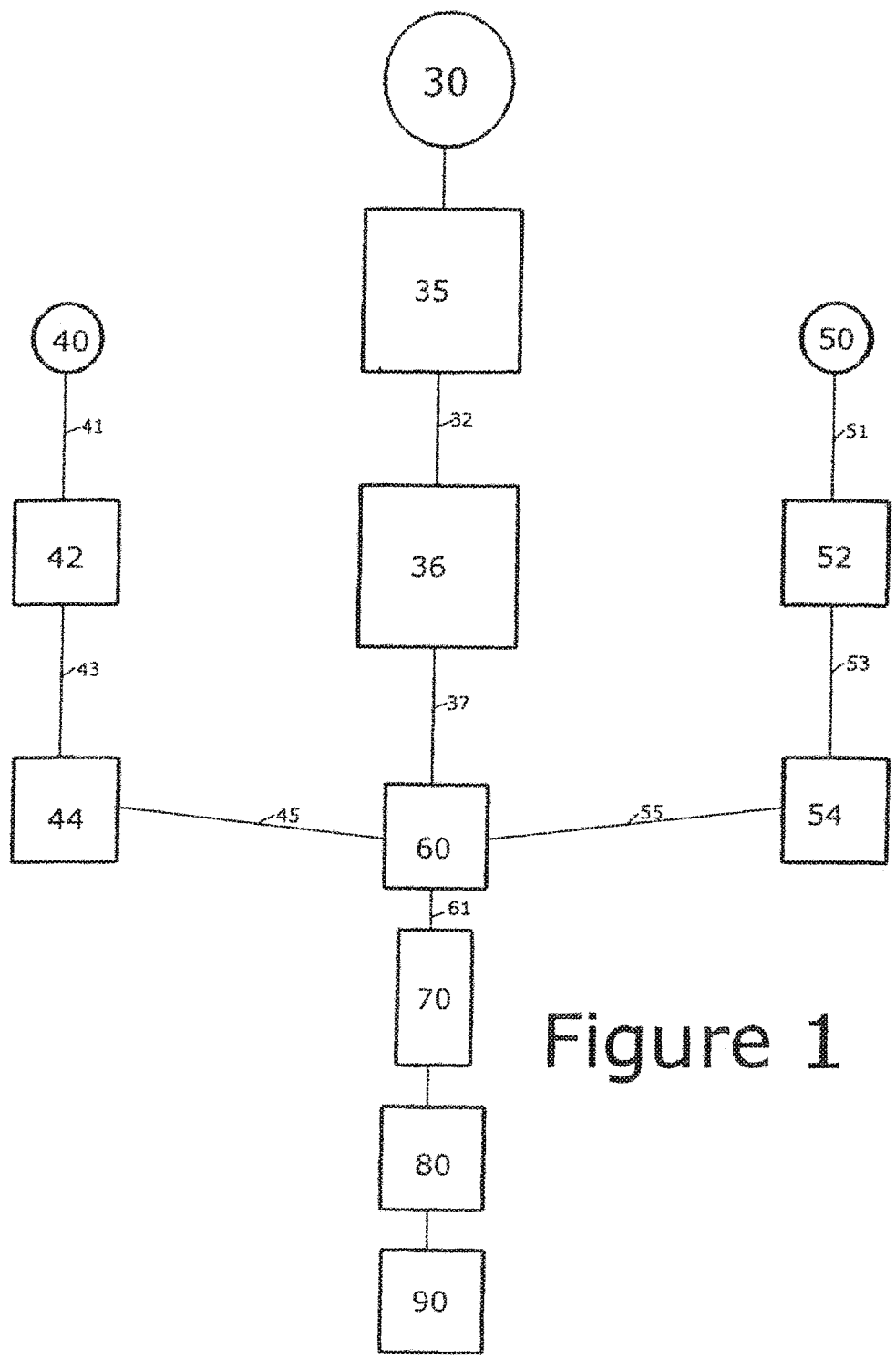
FIG. 1 is a schematic of the process used in making the protein boxes.
Figure 2:
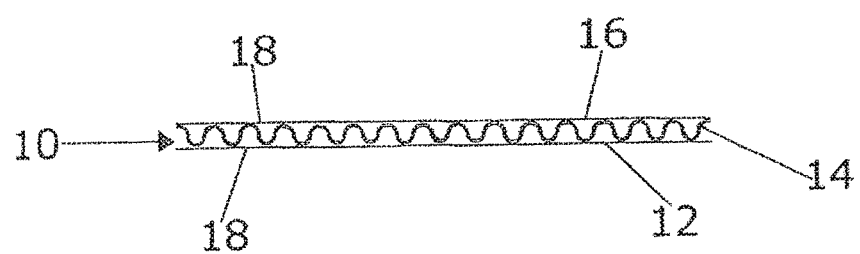
FIG. 2 is an enlarged cross sectional view of the inventive protein box invention.

The preferred embodiments and best mode of the invention are shown in FIGS. 1 and 2. While the invention is described in connection with certain preferred embodiments, it is not intended that the present invention be so limited. On the contrary, it is intended to cover all alternatives, modifications, and equivalent arrangements as may be included within the spirit and scope of the invention as defined by the appended claims.

Definitions

As used herein the following abbreviations and terms are understood to have the meanings as set forth:

"Triglyceride" includes both animal fats and vegetable oils and is derived from one or both of them. Animal fats include beef tallow, pork lard, poultry grease and fish oils. Vegetable oils include soybean oil, peanut oil, olive oil, palm oil, coconut oil and cottonseed oil.

"Paraffin" is a wax-like product derived from petroleum.

"Paper" includes substrates and surfaces of cellulosic material.

It has been found that hydrogenated triglycerides and styrene acrylic co-polymer can be substituted for petroleum based paraffin waxes and wax compounds in the manufacture of paper food boxes, and when these paper boxes are impregnated on the wire side and coated on the felt side, they have superior compression strength, hot melt glue strength, and slide resistance. These application systems involve melted triglycerides held at temperatures in a range from around 170° F. to 190° F. which is either squeezed, rolled, cascaded, sprayed, or doctored onto the wire surface of the linerboard, paper, carton stock, or corrugated medium surface to impregnate the same.

The method and machinery or equipment for repulping and recycling scrap paper in the paper and paperboard or liner board industry is both an established and well known art, and the equipment required is standard and commonly installed at most mills incorporating recycled paper in their manufacturing feed stocks.

The paper liners or paper backers for the corrugated boards have two opposite sides commonly referred to as the felt side and the wire side. In the manufacturing of paper, pulp is initially deposited on a screen which gives the name (wire side) to that side of the paper. After the pulp is deposited on the screen, it is pressed with felt pads to force the water out of the pulp and compress the fibers into the paper form. This side is called the felt side.

Protein boxes are unique paper products that need to withstand water and poultry fluid. The present inventive protein box is made of double backer corrugated board having a corrugated medium of 30 to 40 lb./1000 sq. ft. (MSF) paperboard of an "A", "B", "C", "E" and "F" flute size (weight depends upon various external factors). The preferred flute size used in the invention is an "A" flute having 33+/−3 flutes per lineal foot with a flute thickness of ⅜ inch or a "C" flute having 39+/−3 flutes per lineal foot with a flute thickness of 5/32 inch. A flat liner or backer board of Kraft paper (various grades) is adhered to one side of the fluted medium with a starch based adhesive and a second flat liner or backer board of Kraft paper is adhered to the other side of the fluted medium with a starch based adhesive to form a backed corrugated board. The Kraft paperboard liner may be bleached white, coated white (white coat), mottled white or colored. As is well known in the art, the medium paper is humidified by means of high pressure steam which softens the paper fibers to facilitate the formation of the flute and consequent gluing. After formation of the board, this humidity is removed by drying in the dry-end. In the present invention, the newly formed corrugated liner board is heated from the bottom by hot plates and the adhesive holding components of the structure are cured.

The present degradable protein box 10 is constructed with an inner Kraft paper liner or backer 12 impregnated through the wire side with a hydrogenated triglyceride, preferably beef tallow at 2.0 to 3.0 lbs/MSF, a corrugated paper medium 14 impregnated with a hydrogenated triglyceride, preferably beef tallow at 3.0 to 3.5 lbs/MSF and an outer Kraft paper liner or backer 16 impregnated through the wire side with beef tallow at 2.0 to 3.0 lbs/MSF or other materials which are discussed. Other hydrogenated triglycerides can be used such as animal fats and vegetable oils. Animal fats include beef tallow, pork lard, poultry grease and fish oils. Vegetable oils include soybean oil, peanut oil, olive oil, palm oil, coconut oil and cottonseed oil. The preferred vegetable oil which is used for impregnation is palm oil. Beef tallow used in the impregnation is commercially available from Chemol Corporation. After beef tallow impregnation of the wire side of the paper liners, both liners or backers 16 are coated on their felt side surfaces with a coating 18 having 40% to 70% preferably 50% solids in a styrene acrylic co-polymer solution.

The present protein box 10 is constructed using standard inline corrugated box making machinery as is well known in the art. A roll of the medium paper 30 is positioned upstream of the corrugator. The paper is wetted and passed through a standard corrugating machine 35 and formed into a corrugated medium 32 having the desired flute size, preferably "A" or "C". The corrugated medium 32 is transported downstream through a hydrogenated triglyceride bath 36 (preferably beef tallow) and rollers with the corrugated medium being impregnated with beef tallow at 2.0 to 3.5 lbs/MSF. The impregnated corrugated medium 37 is carried by belts to an assembly station 60 where the coated liner backers 45 and 55 as further described below are secured to the corrugated medium 37 to form a composite sheet protein box carton blank.

As noted above, two liner sheets 41 and 51 of roll stock Kraft paper are removed from the respective rolls 40 and 50 and the respective liner sheets 41 and 51 are transported by rollers (not shown) through separate hydrogenated triglyceride, baths 42 and 52 and their associated rollers which applies the hydrogenated triglyceride, namely, beef tallow to the wire side of liner backer sheets 41 and 51 at 2.5 lbs/MSF impregnating the same. It is believed that the absorbent nature of the wire side of the liner board allows more fibers per pound of impregnation to be treated to the liner board. The now impregnated liner backer sheets 43 and 53 are then transported by rollers and coated on the felt side at coating stations 44 and 54 on a single sheet surface side with a styrene acrylic co-polymer coating 18 heated to about 170° F. The coating can be placed on the felt side backing surface by rollers, doctor blades or spraying as is well known in the art. The coating 18 is water based. The coated liner sheets 45 and 55 are then combined at gluing station 60 using a wet strength glue to the corrugated medium 37 with the starch adhesive having a higher solids content than that presently used in the art with the addition of 16 ounces of penetrate added to each glue volume to form a coated corrugated composite board. The coated and impregnated corrugated composite board 61 is then passed over a heat curing bed 70 to cure and set the adhesive or glue. There were no problems with the glue bond and the bond became stronger over time and the overall box appearance become brighter which was significantly better than prior foodstuff boxes. The heat curing bed 70 is a series of hot plates and pressure rollers which applies light pressure and heat to cure the adhesive and the glue cures very rapidly. The composite corrugated board sheet 61 is then cut into individual blank sections in a cutting and stacking station 80 with known means stacking the individual flat sheets of composite corrugated board. If desired, air impact dryers 90 can be used to dry the flat sheets. The blanks are later placed in a standard box cutting station which cuts and scores the composite poultry box 10.

Another embodiment of the protein box 12 uses hydrogenated triglyceride for impregnation and runs through the same process steps as noted above. The hydrogenated triglyceride is heated to a temperature from about 170° F. to about 200° F.

The coating 18 when styrene acrylic co-polymer is used is a water based high solid fluid solution % by weight of the styrene acrylic co-polymer ranging from about 50% to about 55% most preferably about 52% and has a pH ranging from about 8-9 with fully cured Tg of +7. The coating has a specific gravity of ranging from about 1.04 to about 1.6 and viscosity (cps) of about 400, a vapor density the same as water with 30 minute Cobb values of 30 or better. The coating is fast drying, recyclable, repulpable and is printable and glueable.

The wire side impregnation and felt side coated protein box allows a brighter pre-print and the finished protein box has a greater brightness. The printing has an improved sharpness with wire side impregnation. The process also provides the box with higher slide angle results thus eliminating the need for application of anti-skid products. Not only was an improved slide angle obtained using the inventive process but the typical diminishing of the slide angle over time which occurs in the field was lessened by over 50%. Box compression was 18% greater than that of previous boxes which were not impregnated on the wire side and coated on the felt side with the box also having a high slide angle.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present invention as defined by the following claims:

What is claimed is:

1. A process for making a repulpable and recyclable protein box comprising the steps of:
    a) impregnating a corrugated paper medium with hydrogenated triglyceride (HT);
    b) impregnating a first paper liner board solely through its wire side with HT;
    c) impregnating a second paper liner board solely through its wire side with HT;
    d) coating said impregnated first paper liner board on its felt side with a coating which is a styrene acrylic co-polymer solution having 40% to 70% solids;
    e) coating said impregnated second paper liner board on its felt side with a coating which is a styrene acrylic co-polymer solution having 40% to 70% solids;
    f) securing said first impregnated and coated liner board, said corrugated medium and said second impregnated and coated liner board together with an adhesive to form a composite sheet; and
    g) curing said composite sheet.

2. A process as claimed in claim 1 wherein said hydrogenated triglyceride is beef tallow is 100% by weight.

3. A process as claimed in claim 1 wherein said hydrogenated triglyceride is palm oil.

4. A process as claimed in claim 1 wherein said adhesive is a starch solution.

5. A process as claimed in claim 4 wherein said starch adhesive has a solid content ranging from about 25% to about 35%.

6. A process as claimed in claim 1 wherein the hydrogenated triglyceride is an animal fat selected from one or more of a group consisting of beef tallow, pork lard, poultry grease, and fish oils.

7. A process as claimed in claim 1 wherein the hydrogenated triglyceride is a hydrogenated vegetable oil selected from one or more of a group consisting of soybean oil, peanut oil, olive oil, palm oil, coconut oil and cottonseed oil.

8. A process for making a repulpable and recyclable protein box as claimed in claim 1 wherein the protein box is a poultry box.

9. A process for making a repulpable and recyclable protein box as claimed in claim 1 including the step of:
    a) cutting the composite sheet into blanks.

* * * * *